United States Patent Office 2,919,992
Patented Jan. 5, 1960

2,919,992

EGG WHITE PRODUCT AND PROCESS OF FORMING SAME

James M. Gorman and Arthur C. Keith, Topeka, Kans., assignors to Seymour Foods, Inc., Topeka, Kans., a corporation of Kansas No Drawing. Application May 22, 1958
Serial No. 736,967

9 Claims. (Cl. 99—210)

The present invention relates generally to a new and improved egg white product and process of forming the same, the product being readily adapted for drying to form a substantially dustless dried egg white, the product further being readily adapted for freezing in the liquid state or for immediate use in the liquid state. The egg white product of the present invention, regardless of the final form of the same as hereinbefore set forth, exhibits improved whipping and baking properties by having been treated with triacetin and calcium stearyl-2-lactylate, these treating agents cooperating to minimize dusting of the egg white product in its dried state and further co-operating to impart to the egg white product, regardless of its final state, improved whipping and baking properties accompanied by a decrease in whipping time.

Heretofore, a substantial number of treating agents or ingredients have been proposed for use with egg whites for the purpose of improving the whipping and cake volume producing baking properties of the egg whites. In certain instances these agents or ingredients have been found incapable of providing dried egg white solids with the desired physical characteristics, such as, for example, minimum or substantially eliminated dusting during handling of the dried product. This has been particularly true in the instances where the treated egg whites are dried by any known type of spray drying process. Under these circumstances it has been often found preferable to utilize anti-dusting agents in an effort to minimize dusting of the product following dehydration.

It has also been found in the past that certain treating agents are capable of imparting improved properties to egg whites only if the egg whites are handled under certain prescribed conditions following addition thereto of the treating agent. In this respect, certain treated egg whites have not been found suitable for storage by freezing and where such egg whites also present a dusting problem in the dried state, it has been found preferable to utilize the egg whites in the liquid state immediately after treating thereof. Under these circumstances, it will be appreciated that treatment of egg whites immediately before use thereof creates a number of practical problems and it is much more preferable to provide egg whites either in the frozen or dried state, which egg whites are readily stored in their treated condition and are ready for immediate use at any time without further treatment.

It is an object of the present invention to provide a new and improved egg white product having incorporated therein a combination of treating agents which impart to the product improved whipping and baking properties, the treating agents further minimizing dust formation in the product when the same is in the dried state.

Still a further object is to provide a new and improved liquid egg white product treated in conformance with the teachings of the present invention, the product being readily adapted for drying or freezing depending upon the type of storage and handling conditions desired.

Another object is to provide a new and improved frozen egg white product having incorporated therein a combination of treating agents which impart to the product improved whipping and baking properties.

Another object of the present invention is to provide a new and improved dried egg white product having incorporated therein a combination of treating agents which minimize dust formation while imparting to the product improved whipping and baking properties.

A further object is to provide a new and improved process of forming egg white products which exhibit improved whipping and baking properties while being shelf stable in liquid, frozen or dried condition, the preferred form of the process including the initial step of glucose conversion to provide the product with shelf stability followed by treatment of the egg white material with the ingredients of the present invention.

Other objects not specifically set forth will become apparent from the following detailed description of the present invention.

It has been found that by the addition of quantities of triacetin and calcium stearyl-2-lactylate to egg white material, the resultant product in liquid, frozen or dried form is substantially improved as to its whipping and baking properties when used in accordance with common and well known practices. Still further, the presence of these agents or ingredients in dried egg white material inhibits objectional dusting frequently characteristic of spray dried egg white solids. The dried egg white product may be readily reconstituted by the addition of water accompanied by stirring in the known manner and the whipping time necessary to prepare the reconstituted egg white product for baking purposes is reduced. The whipped egg white product exhibits improved baking properties in that the foam gravity of the same is low and, when incorporated in a batter, the gravity of the latter is also reduced. Resultant cake volumes are appreciably increased as compared with untreated egg white solids. Similarly, a frozen egg white product treated in accordance with the principles of the present invention may be readily thawed and used for baking purposes in the known manner. Treated liquid egg whites, whether retained at all times in the liquid form prior to use, or frozen and subsequently thawed, exhibit improved properties particularly in connection with reducing the whipping time necessary to complete a cake batter for baking.

Triacetin or gylceryl triacetate is a triglyceride with the formula $(CH_3COO)_3C_3H_5$. Calcium stearyl-2-lactylate is commonly available under the trade name "CaVerv" and has the following average structural formula

$(C_{17}H_{35}CO(OCHCH_3CO)_2O)_2Ca$

An important function of the triacetin resides in its ability to inhibit objectional dusting following the spray drying process in the event that such a process is used to dry the treated egg white material. Consequently, the triacetin is preferably added to the liquid egg whites prior to drying although the calcium stearyl-2-lactylate may be added either prior to or subsequent to the drying operation. For maximum results the calcium stearyl-2-lactylate is preferably added prior to drying. In connection with the treatment of egg whites for either immediate use in the liquid form or freezing for storage purposes, it has been found that the combined treating agents should be added to the liquid egg whites prior to batter preparation or egg white freezing.

The amounts of each of the ingredients used may vary considerably depending on subsequent handling of the product. Where a dried product is to be formed, a preferred range of quantities of each of the ingredients is about 0.25% to 1.0% on a finished product dry weight basis. Quantities greater than 1.0% will still function to improve the whipping and baking properties but no discernible further improvement is noted above the 1.0% level of treatment. Quantities below the level of 0.25% are considered to be substantially incapable of providing the egg white solids with the improved properties. In connection with the preferred range of treatment for a dried product, it has been found that 0.5% levels for each of the additives appear to give optimum results.

Where the egg white product is to be retained in its liquid state or frozen for storage purposes, the preferred level of treatment varies somewhat from that preferred in forming a dried product. Here again, the amounts of each of the agents or ingredients used may vary considerably. However, a preferred range of quantities of each of the agents is about 0.01% to 0.1% on a finished liquid product weight basis. The optimum level of treatment of each of the agents is about 0.05% on a liquid weight basis.

In order to provide an egg white product exhibiting shelf stability, it is preferred to convert the glucose of the egg white prior to the adding of the treating agents of the present invention. Many different known glucose converting treatments may be utilized in converting the objectionable sugars of the egg white material. Liquid egg whites may be desugarized by yeast or natural fermentation in any well known manner. Preferably, in carrying out the process of the present invention, the glucose is converted by the use of a glucose oxidase enzyme in the presence of oxygen. This particular method of removing sugars by enzymatic treatment is disclosed in U.S. Patent No. 2,744,017. Glucose oxidase in the presence of oxygen converts the glucose present in the egg white material to gluconic acid. The necessary oxygen is provided by the addition of hydrogen peroxide to the system and further by the formation of hydrogen peroxide during the glucose oxidation step. This is a well known process and results in a stable egg product which may be readily dehydrated during a subsequent drying operation without the tendency to undergo a browning reaction during either drying or subsequent storage. In carrying out the process of the present invention, any suitable freezing or drying procedures may be followed although, in connection with providing a dried product, spray drying is particularly contemplated due to the treating of the egg white material to prevent substantial dusting. However, drying processes such as pan drying or fluff drying may be resorted to if desired without reducing the improving effects of the additives or treating agents.

The following examples are illustrative of the present invention and are not to be construed as limiting thereto.

*Example 1*

A dried egg white product prepared as a control without the addition of the treating agents of the present invention was reconstituted in 2 minutes and required 3½ minutes to thoroughly whip into a suitable foam. The following results were noted:

Foam gravity _____ 0.270
Battery gravity _____ 0.410
Cake volume _____cc__ 2710

*Example 2*

Dried egg white solids treated with 0.5% triacetin and 0.5% calcium stearyl-2-lactylate were reconstituted in 2 minutes and whipped to a substantial foam in 2½ minutes. The following results were noted:

Foam gravity _____ 0.163
Batter gravity _____ 0.307
Cake volume _____cc__ 4795

*Example 3*

Dried egg white solids treated with 0.25% calcium stearyl-2-lactylate and 0.25% triacetin were reconstituted in 2 minutes and whipped to a substantial foam in 2½ minutes. The following results were noted:

Foam gravity _____ 0.208
Batter gravity _____ 0.357
Cake volume _____cc__ 4405

*Example 4*

Dried egg white solids treated with 1.0% calcium stearyl-2-lactylate and 1.0% triacetin were reconstituted in 2 minutes and whipped to a substantial foam in 2½ minutes. The following results were noted:

Foam gravity _____ 0.158
Batter gravity _____ 0.294
Cake volume _____cc__ 4720

From the foregoing it will be noted that the foam and batter gravities of the treated products were substantially less than those of the control. Still further, the cake volume showed a substantial increase. In each instance the egg white products were spray dried and those treated with the agents of the present invention did not show substantial dusting as compared to the substantial dusting noted with the control product. The whipping time was also reduced as noted above.

*Example 5*

Angel cakes were made using the following batter recipe, the batter being prepared in two stages in an 80 quart commercial mixer.

1st stage:
  6 lbs. 10 oz. sugar
  20 lbs. 0 oz. untreated defrosted egg whites
  5 oz. cream of tartar
  2½ oz. salt
  ½ oz. concentrated flavor 2nd stage:
  13 lbs. 6 oz. sugar
  7 lbs. 0 oz. cake flour The following results were noted:
Whip time (3rd speed) _____min__ 20
Foam gravity _____gms./cc__ 0.17
Batter gravity _____gms./cc__ 0.33
Cake volume _____mm__ 95

*Example 6*

The recipe of Example 5 was used in preparing cake batter with defrosted egg whites having been treated prior to freezing with 0.01% each of triacetin and calcium stearyl-2-lactylate, with the following results being noted.

Whip time (3rd speed)_____min__ 20
Foam gravity_____gms./cc__ 0.17
Batter gravity_____gms./cc__ 0.33
Cake volume_____mm__ 96

*Example 7*

Th recipe of Example 5 was used in preparing cake batter with defrosted egg whites having been treated prior to freezing with 0.05% each of triacetin and calcium stearyl-2-lactylate, with the following results being noted:

Whip time (3rd speed)_____min__ 10
Foam gravity_____gms./cc__ 0.16
Batter gravity_____gms./cc__ 0.31
Cake volume_____mm__ 100

*Example 8*

The recipe of Example 5 was used in preparing cake batter with defrosted egg whites having been treated prior to freezing with 0.1% each of triacetin and calcium stearyl-2-lactylate, with the following results being noted:

Whip time (3rd speed)_____min__ 10
Foam gravity_____gms./cc__ 0.16
Batter gravity_____gms./cc__ 0.30
Cake volume_____mm__ 101

In Examples 5, 6, 7 and 8 the cakes were prepared by scaling 17 oz. of batter into nine inch tube pans and baking at 375° about 25 minutes. It will be noted that the whip time of the batter including the treated whites of Example 7 was approximately ½ that of the batter of Example 5 wherein untreated egg whites were used.

As previously set forth, the triacetin and calcium stearyl-2-lactylate will normally be added to the glucose converted liquid egg whites prior to the drying or freezing process. However, the triacetin may also be added subsequent to the drying step by dry blending the ingredient with the dried egg whites. Calcium stearyl-2-lactylate should preferably be added to the egg whites prior to drying for maximum results. Both treating agents should be added prior to freezing.

This is a continuation-in-part application of our copending application, Serial No. 626,087, filed December 4, 1956, now abandoned.

We claim:

1. A dried egg white product including quantities of at least about 0.25% each of triacetin and calcium stearyl-2-lactylate therein to provide for improved properties during whipping of said product and use thereof in baking.

2. A dried egg white product including quantities of from about 0.25% to 1.0% of both triacetin and calcium stearyl-2-lactylate therein to provide for improved properties during whipping of said product and use thereof in baking.

3. A liquid egg white product particularly adapted for storing in the frozen state, said product including quantities of at least about 0.01% each of triacetin and calcium stearyl-2- lactylate therein to provide for improved properties during whipping of said product and use thereof in baking.

4. A liquid egg white product particularly adapted for storing in the frozen state, said product including quantities of from about 0.01% to 0.1% on a liquid weight basis each of triacetin and calcium stearyl-2-lactylate therein to provide for improved properties during whipping of said product and use thereof in baking.

5. The process of preparing a substantially dustless dried egg white product of improved whipping and baking properties comprising, subjecting liquid egg whites to glucose conversion treatment, adding at least about 0.25% of both triacetin and calcium stearyl-2-lactylate to said glucose converted liquid egg whites to provide for the dustless and improved whipping and baking properties of said product, and, thereafter, drying the same.

6. The process of preparing a substantially dustless dried egg white product of improved whipping and baking properties comprising, subjecting liquid egg whites to glucose conversion treatment, adding quantities of from about 0.25% to 1.0% on a dry weight basis of both triacetin and calcium stearly-2-lactylate to said glucose converted liquid egg whites, and thereafter, drying the same.

7. The process of preparing a substantially dustless dried egg white product of improved whipping and baking properties comprising, adding at least about 0.25% of calcium stearyl-2-lactylate to liquid egg whites, drying the treated egg whites, and thereafter, dry blending at least about 0.25% of triacetin with said dried egg whites, the quantities of calcium stearyl-2-lactylate and triacetin added being sufficient to provide for the dustless and improved whipping and baking properties of said product.

8. The process of preparing a frozen egg white product comprising, adding at least about 0.01% of both triacetin and calcium stearyl-2-lactylate to liquid egg whites to provide for improved properties during whipping of said product and use thereof in baking, and, thereafter, freezing the same.

9. The process of preparing a frozen egg white product comprising, adding quantities of from about 0.01% to 0.1% on a liquid weight basis of both triacetin and calcium stearyl-2-lactylate to liquid egg whites, and, thereafter, freezing the same.

References Cited in the file of this patent

UNITED STATES PATENTS

| | | |
|---|---|---|
| 2,812,209 | Newton et al. | Dec. 5, 1939 |
| 2,637,654 | Kothe | May 5, 1953 |
| 2,744,017 | Baldwin | May 1, 1956 |
| 2,758,935 | Shaffer | Aug. 14, 1956 |